(12) United States Patent
Chambers et al.

(10) Patent No.: US 8,506,654 B2
(45) Date of Patent: Aug. 13, 2013

(54) DISPERSE DYE MIXTURES WHICH HAVE A HIGH DEGREE OF LIGHT FASTNESS AND BUILD-UP

(75) Inventors: Van Chambers, Rock Hill, SC (US); Lyle Burleyson, Mt. Pleasant, NC (US); Ronald Pedemonte, Wesley Chapel, NC (US)

(73) Assignee: DyStar L.P., Charlotte, NC (US)

( * ) Notice: Subject to any disclaimer, the term of this patent is extended or adjusted under 35 U.S.C. 154(b) by 0 days.

(21) Appl. No.: 13/074,135

(22) Filed: Mar. 29, 2011

(65) Prior Publication Data

US 2012/0246843 A1    Oct. 4, 2012

(51) Int. Cl.
*D06P 1/20* (2006.01)
*D06P 1/00* (2006.01)

(52) U.S. Cl.
USPC .................................................. 8/643; 8/922

(58) Field of Classification Search
USPC ............................................................. 8/643
See application file for complete search history.

(56) References Cited

U.S. PATENT DOCUMENTS

| | | | |
|---|---|---|---|
| 6,616,711 | B1 | 9/2003 | Kanzig et al. |
| 7,824,451 | B2 | 11/2010 | Hihara et al. |
| 2006/0230549 | A1* | 10/2006 | Hihara et al. ................. 8/534 |
| 2007/0271710 | A1 | 11/2007 | Hosoda et al. |

FOREIGN PATENT DOCUMENTS

| | | | |
|---|---|---|---|
| JP | 4-164969 A | | 6/1992 |
| JP | 4173871 A | | 6/1992 |
| JP | 04173872 A | | 6/1992 |
| JP | 9 176509 | | 7/1997 |
| JP | 2004168950 A | * | 6/2004 |
| JP | 2004168950 A | | 6/2004 |
| WO | WO-2007/058209 A1 | | 5/2007 |

OTHER PUBLICATIONS

Derwent abstract published in English, Derwent Acc-No. 2004-520447 of Fujisaki et al. JP 2004-168950A.*

English machine translation of Fujisaki et al. (JP 2004-168950 A), accessed from the AIPN Japan Patent Office online translator on Aug. 28, 2012 and attached as a PDF.*

* cited by examiner

*Primary Examiner* — Harold Pyon
*Assistant Examiner* — Katie L Hammer
(74) *Attorney, Agent, or Firm* — Novak Druce Connolly Bove + Quigg LLP

(57) ABSTRACT

A dye composition which contains a blue colored dye mixture which contains from 71 to about 90 wt % with respect to the total pigment fraction of a blue pigment which is represented by structural formula [1]

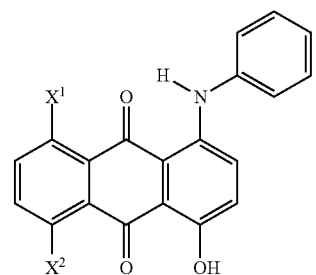

(1)

wherein one of $X^1$ and $X^2$ represents $NO_2$ and the other represents OH,
from about 10 to about 30 wt % with respect to the total pigment fraction of two different blue pigments which are different and are represented by structural formula [2]

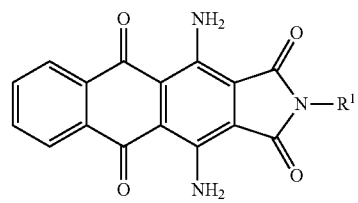

(2)

wherein $R^1$ represents $-C_3H_6OCH_3$, $-C_3H_6OC_2H_5$ or $-C_3H_6OC_2H_4OCH_3$.

16 Claims, No Drawings

DISPERSE DYE MIXTURES WHICH HAVE A HIGH DEGREE OF LIGHT FASTNESS AND BUILD-UP

BACKGROUND OF THE INVENTION

The invention concerns disperse dyes for dyeing polyester-based fibers. In particular, the invention concerns disperse dye mixtures which have good fastness even on polyester-based fibers of fine denier which are disadvantageous in terms of light fastness, and with which mixed fibers where the thickness of the polyester-based fibers differs (mixed fibers of different fineness) or fiber mixtures comprising polyester-based fibers which can be dyed with cationic dyes and regular polyester-based fibers can be dyed the same color.

Cloths comprising polyester-based fibers are often used as the material for automobile seats, but more recently a demand has arisen for richer seat colors as more emphasis has been placed on the fashion aspect of the interior furnishing of automobiles. However, automobile seats are often exposed to high temperatures and sunlight when the cabin is closed and so color fading of the seats is liable to arise and it is difficult to ensure that the beautiful color will be retained over a prolonged period of time. Disperse dyes are generally used for dyeing polyester-based fibers, but dyes which have especially good light fastness must be used in the case of automobile seat applications. Moreover, more recently there have been many cases where fine denier polyester-based fibers have been used for automobile seat materials, and when these are dyed using the same dyes it is observed that the light fastness is worse than that observed when regular polyester-based fibers have been used. Against the background of these facts a demand has arisen at the present time for dyes for automobile seats which have better light fastness than that in the past.

In the past no dye which had good light fastness and with which dyeing could be carried out with good reproducibility with these fine denier polyester-based fibers in particular had been discovered. Then, the present inventors took up this problem and Japanese Patent Application 2002-338636 was made.

More recently, from the viewpoint of the diversity of taste and fashion, automobile interior furnishings comprising mixed fibers comprising polyester-based fibers of different thickness and automobile interior furnishings comprising polyester-based fibers which can be dyed with cationic dyes and regular polyester-based fibers have been produced.

Dyes of the three primary colors designed for automobile interior furnishings were known in the past (for example, see Japanese Unexamined Patent Application Laid Open H4-164969 and Japanese Unexamined Patent Application Laid Open H9-176509), but even when these dyes are used it is difficult at the present time to dye these automobile internal furnishings, and especially car seats, the same color with good reproducibility and with excellent light fastness.

U.S. Pat. No. 7,824,451 discloses the use of a dye mixture which comprises a blue colored dye mixture which contains from 10 to 60 wt % with respect to the total pigment fraction of a blue pigment which is a mixture of the two isomers which can be represented by structural formula [1]

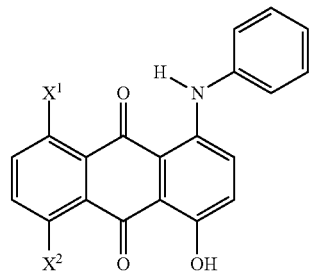

(1)

wherein one of $X^1$ and $X^2$ represents $NO_2$ and the other represents OH, from 60 to 10 wt % with respect to the total pigment fraction of a blue pigment which can be represented by structural formula [2]

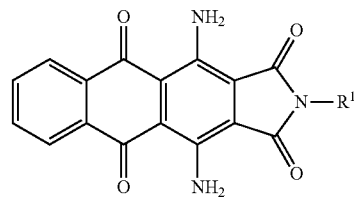

(2)

wherein $R^1$ represents —$C_3H_6OCH_3$, —$C_3H_6OC_2H_5$ or —$C_3H_6OC_2H_4OCH_3$, from 10 to 30 wt % with respect to the total pigment fraction of the blue pigment which can be represented by structural formula [3]

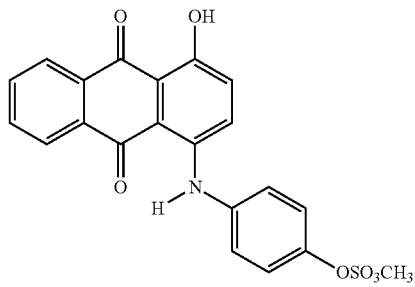

(3)

and from 20 to 0 wt % with respect to the total pigment fraction of a blue pigment which can be represented by structural formula [4]

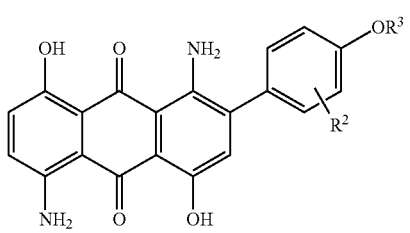

(4)

wherein $R^2$ represents a hydrogen atom or a $C_1$ or $C_2$ alkyl group, and $R^3$ represents a hydrogen atom, a $C_1$ or $C_2$ alkyl group or a $C_1$ or $C_2$ alkoxy $C_1$ or $C_2$ alkyl group.

SUMMARY OF THE INVENTION

The present invention is based on an understanding of the facts outlined above and is intended to provide disperse dye mixtures with which polyester-based fibers, and especially fine denier polyester-based fibers, can be dyed with good light fastness, and which are suitable for dyeing polyester-based fiber mixtures of different thickness (mixed fibers of different fineness) or polyester-based fibers comprising polyester-based fibers which can be dyed with cationic dyes and regular polyester-based fibers the same color and with good reproducibility.

The inventors have discovered that blue dye mixtures, yellow dye mixtures and red dye mixtures which have excellent light fastness are obtained by mixing specified dyes in certain proportions, and that when these are used as compound colors, not only is the light fastness excellent but the dyeing rates of each color are matched, and polyester-based fibers of different thickness or polyester-based fibers comprising polyester-based fibers which can be dyed with cationic dyes and polyester-based fibers can be dyed the same color and with good reproducibility easily, and the invention is based upon this discovery.

Thus, the invention comprises a blue colored dye mixture which contains from 71 to 90 wt %, and preferably 72 to 85 wt %, and more preferably 75 to 85 wt % with respect to the total pigment fraction of a blue pigment which is represented by structural formula [1]

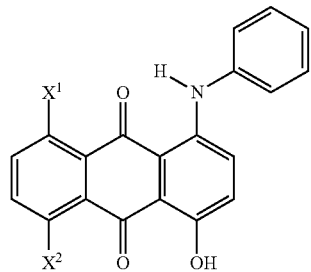

(1)

wherein one of $X^1$ and $X^2$ represents $NO_2$ and the other represents OH, from 10 to 29 wt %, preferably 15 to 28 wt % and more preferably 15 to 25 wt % with respect to the total pigment fraction of two different blue pigments which are different and can be represented by structural formula [2]

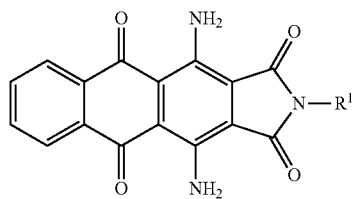

(2)

wherein $R^1$ represents $-C_3H_6OCH_3$, $-C_3H_6OC_2H_5$ or $-C_3H_6OC_2H_4OCH_3$, The invention also relates to a method of dyeing polyester-based fibers which comprises contacting the fibers with the composition.

The invention also relates to a dyed polyester-based fiber material which has been dyed using a blue dye composition.

The invention also relates to a method of dyeing polyester-based fibers in which the polyester-based fibers are mixed fibers of different fineness.

The invention also relates to a dyed polyester-based fiber material in which the polyester-based fibers are mixed fibers of different fineness.

The invention also relates to a method of dyeing polyester-based fibers in which the polyester-based fibers are mixed fibers comprising polyester-based fibers which can be dyed with a cationic dye and regular polyester-based fibers.

The invention also relates to a dyed polyester-based fiber material in which the polyester-based fibers are mixed fibers comprising polyester-based fibers which can be dyed with a cationic dye and regular polyester-based fibers.

The invention further comprises a dye composition in which, in a blue dye mixture as disclosed above, there is compounded the yellow dye indicated below and/or the red dye indicated below.

The dye mixture contains at least one yellow dye, at least one red dye or a yellow and red dye mixture wherein said yellow dye contains a yellow pigment represented by structural formula [5]

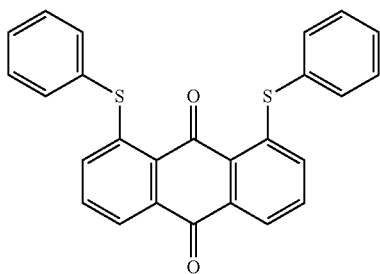 [SMILES: O=C1c2cccc(Sc3ccccc3)c2C(=O)c2c(Sc3ccccc3)cccc21]

a yellow pigment represented by structural formula [6]

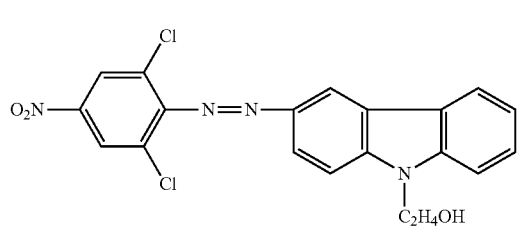

(6)

or a yellow pigment represented by structural formula [7]

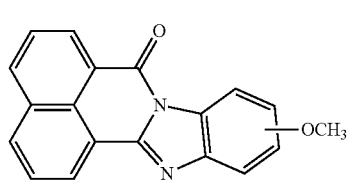

(7)

or a mixture of at least two of the a yellow pigments of the structure formulas (5), (6) or (7), and said red dye contains a red pigment represented by structural formula [8]

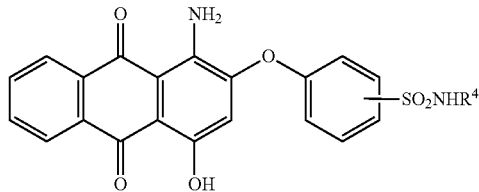

wherein $R^4$ represents a $C_1$ to $C_3$ alkoxy $C_1$ to $C_3$ alkyl group,
a red pigment represented by the structural formula [9]

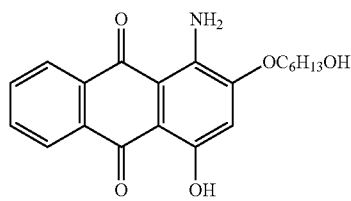

or a red pigment represented by structural formula [10]

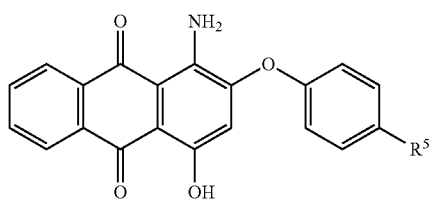

wherein $R^5$ represents a hydrogen atom, a chlorine atom or a bromine atom, or a compound of the formula (11)

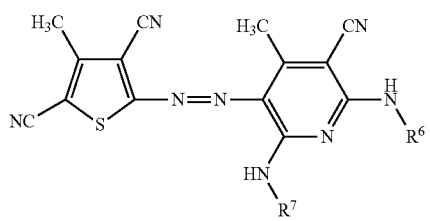

wherein one of $R^6$ and $R^7$ is a hydrogen atom and the other is hydroxyethoxyethyl, hydroxybutoxypropyl, acetoxyethoxyethyl or acetoxybutoxypropyl
or a mixture of at least two of the a red pigment of the structure formulas (8), (9) or (10).

In another embodiment, the yellow dye could be a yellow dye mixture containing from 25 to 75 wt % with respect to the whole pigment fraction of the yellow pigment which can be represented by structural formula [5]
from 60 to 20 wt % with respect to the whole pigment fraction of the yellow pigment which can be represented by structural formula [6]
and from 15 to 5 wt % with respect to the whole pigment fraction of the yellow pigment which can be represented by structural formula [7]

In another embodiment, the red dye could also be a mixture which contains from 30 to 60 wt % with respect to the whole pigment fraction of a red pigment which can be represented by structural formula [8],
from 70 to 20 wt % with respect to the whole pigment fraction of the red pigment which can be represented by the structural formula [9],
and from 0 to 20 wt % with respect to the whole pigment fraction of a red pigment which can be represented by structural formula [10].

In another embodiment, the composition can contain a mixture of red and yellow pigments described above.

The invention further comprises a method of dyeing polyester-based fibers in which a dye mixture as disclosed above is used, and the dyed materials obtained by this means.

In a preferred method of dyeing the polyester-based fibers are mixed fibers of different fineness or mixed fibers comprising polyester-based fibers which can be dyed with cationic dyes and regular polyester-based fibers, and the dyed materials obtained by this means.

A DETAILED DESCRIPTION OF THE INVENTION

The invention is described in more detail below.
Thus, the invention comprises a blue colored dye mixture which contains from 71 to 90 wt %, and preferably 72 to 85 wt %, and even more preferably 75 to 85 wt % with respect to the total pigment fraction of a blue pigment which is represented by structural formula [1]

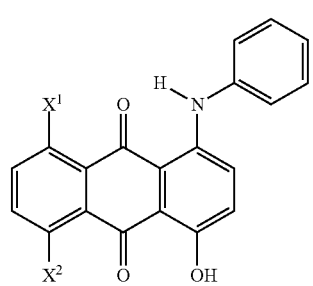

wherein one of $X^1$ and $X^2$ represents $NO_2$ and the other represents OH, from 10 to 29 wt %, preferably 15 to 28 wt % and more preferably 15 to 25 wt % with respect to the total pigment fraction of two different blue pigments which are different and can be represented by structural formula [2]

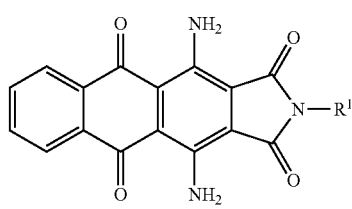

wherein $R^1$ represents —$C_3H_6OCH_3$, —$C_3H_6OC_2H_5$ or —$C_3H_6OC_2H_4OCH_3$, The invention preferably does not have any pigment fraction represented by structural formula (3) or (3')

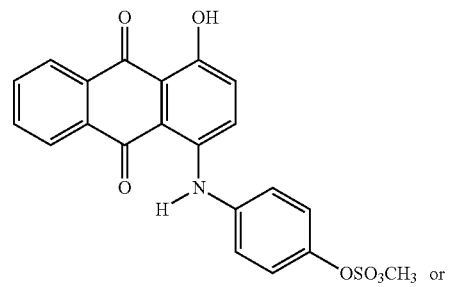

(3)

(3')

wherein $X_1$ is a chlorine or bromine atom and $R_1$ is a benzoyl group, a cyanoethyl group, a $C_1$-$C_4$ alkyl group or a phenyl group substituted by at least one $C_1$-$C_4$ alkyl group.

The composition preferably comprises about 71 to 90 wt % with respect to the total pigment fraction of a blue pigment which is represented by structural formula [1']

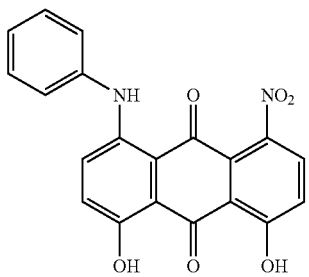 [SMILES: O=C1c2c(O)ccc(Nc3ccccc3)c2C(=O)c2c([N+](=O)[O-])ccc(O)c21]

and from about 5 to about 15 wt % with respect to the total pigment fraction of a blue pigments which is represented by structural formula [2']

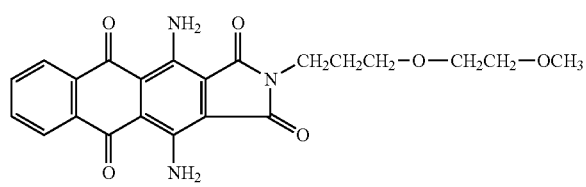

[2']

and from 5 to 15 wt % with respect to the total pigment fraction of a blue pigments which is represented by structural formula [2"]

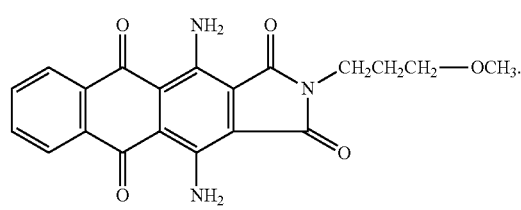

[2"]

The blue dye mixture in this invention contains the blue pigments represented by the aforementioned structural formulae [1], [2'], and [2"] in proportions with respect to the total pigment fraction of (from 71 to 90 wt %)/(from 5 to 15 wt %)/(from 5 to 15 wt %)/(respectively).

Furthermore, the invention can contain at least one yellow pigment of the formulae (5), (6) or (7). Additionally, the invention can contain at least one red pigment of the structural formulae [8], [9] and [10] or [11]. The invention can contain a mixture of yellow and red dyes with the blue dye mixture described above.

In another embodiment, the yellow dye could be a mixture and contain the pigments represented by the aforementioned structural formulae [5], [6] and [7] in proportions with respect to the total pigment fraction of (from 25 to 75 wt %)/(from 60 to 20 wt %)/(from 15 to 5 wt %), respectively, and preferably of (from 40 to 60 wt %)/(from 50 to 25 wt %)/(from 10 to 15 wt %), and the red dye mixtures contain the pigments represented by the aforementioned structural formulae [8], [9] and [10] or [11] in proportions with respect to the total pigment fraction of (from 30 to 60 wt %)/(from 70 to 20 wt %)/(from 0 to 20 wt %), respectively, and preferably of (from 40 to 55 wt %)/(from 50 to 25 wt %)/(from 10 to 20 wt %).

By mixing these various pigments the dyeing rate can be made to conform more closely with the aforementioned blue dye mixture. Disperse dyes in an amount up to 5 wt % where there is no loss of the effect of the invention can be added to and included in the respective blue, yellow and red dye mixtures as color shading components for correcting the color shade.

Furthermore, each color mixture can be compounded and used in any proportion for dyeing to the desired color shade. In this case, the dyeing rates of each color on each type of polyester-based fiber are made to conform and as a result the dyeing process is simple.

Ultraviolet absorbers can be used conjointly with the dye mixtures of this invention, but dyed material which has satisfactory light fastness can be obtained without their particular use. Moreover, dyeing can also be carried out under alkaline conditions which are used as a precipitated polyester oligomer countermeasure.

The pigments represented by the aforementioned structural formulae [1], [2] and [4] to [10] are insoluble or sparingly soluble in water and so for dyeing polyester-based fibers using the dyes of this invention a dye bath or printing paste where the dyes which have been formed into fine particles and dispersed in an aqueous medium using, for example a condensate of naphthalene sulfonic acid and formaldehyde, a higher alcohol sulfuric acid ester or higher alkylbenzene-sulfonic acid salt as a dispersing agent in the usual way is prepared and the dyeing is carried out by dip-dyeing or printing. The dip-dyeing method is especially desirable. In the case of dip-dyeing it is possible to dye polyester-based fibers or mixed weave products with excellent light fastness if a normal dyeing process is carried out using, for example, the high temperature dyeing method, the carrier dyeing method or the thermosol dyeing method.

The polyester-based fibers are described below.

The generally well-known fibers comprising polyethylene terephthalate, polytrimethylene terephthalate and polybutylene terephthalate and the polylactic acid fibers comprising aliphatic polyesters which are known as biodegradable polyester-based fibers can be cited as polyester-based fibers which can be dyed with the dyes of this invention. Moreover, the polyester-based fibers which can be dyed with cationic dyes at normal pressure obtained by copolymerizing 5-sulfonato-sodiumisophthalic acid can also be cited. Moreover, polyester-based fibers obtained by mixing the various types of polyester-based fibers mentioned above can also be dyed effectively.

The dye mixtures of this invention demonstrate their effect in particular when dyeing polyester-based fibers comprising very fine fibers of 1.0 denier or below, mixed polyester-based fibers comprising very fine fibers and fibers of from 1 to 5 denier, and mixed fibers comprising polyester-based fibers which can be dyed with cationic dyes and regular polyester-based fibers.

ILLUSTRATIVE EXAMPLES

The invention is described in more practical terms below by means of examples and comparative examples, but the invention is not limited by these examples. Examples 1 through 7 contained dyes represented by the structural formulae [1'], [2'], [2''] and [7] were prepared in portions indicated in Table 1.

Structural Formula [1']

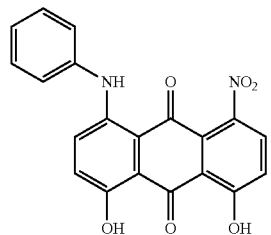

Structural Formula [2']

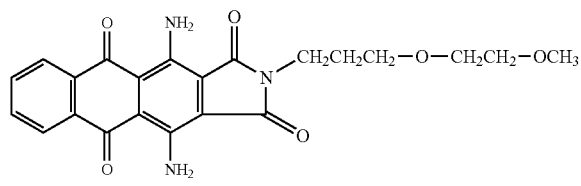

Structural Formula [2'']

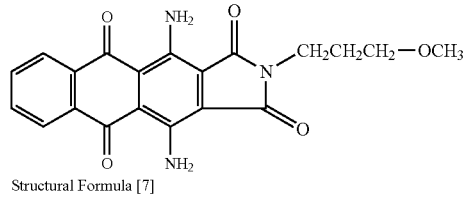

Structural Formula [7]

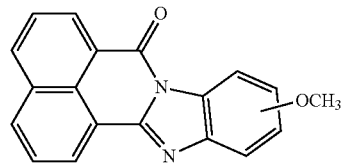

TABLE 1

| Example # | % Dye [1'] | % Dye [2'] | % Dye [2''] | % Dye [7] |
|---|---|---|---|---|
| 1 | 70 | 13.5 | 13.5 | 3.0 |
| 2 | 72 | 14.0 | 14.0 | 0.0 |
| 3 | 72 | 12.5 | 12.5 | 3.0 |

TABLE 1-continued

| Example # | % Dye [1'] | % Dye [2'] | % Dye [2''] | % Dye [7] |
|---|---|---|---|---|
| 4 | 75 | 11.0 | 11.0 | 3.0 |
| 5 | 78 | 9.5 | 9.5 | 3.0 |
| 6 | 80 | 8.5 | 8.5 | 3.0 |
| 7 | 82 | 7.5 | 7.5 | 3.0 |
| 8 | 85 | 6.0 | 6.0 | 3.0 |
| 9 | 87 | 5.0 | 5.0 | 3.0 |
| 10 | 90 | 5.0 | 5.0 | 0.0 |

The dye mixtures were mixed with an equal weight of dispersing agent comprising naphthalensulfonic acid formaldehyde condensate or higher alcohol sulfuric acid ester or the like or lignin sulfonates and then formed into fine particles and dried in the usual way, and blue dye mixtures were obtained.

Dye baths were prepared by dispersing 100 mg of the blue dye mixture in 100 ml of water which contained dye promoter and acetic acid/sodium acetate pH buffer solution and 10 g samples polyester-based fiber cloth for car seat purposes were immersed in the dye bath and dyed for 30 min at 135° C., after which they were subjected to a reducing rinse, water rinse and drying in the usual way, and blue dyed materials were obtained. The blue dyed material exhibited excellent fastness properties, in particular light-fastness.

EFFECT OF THE INVENTION

Polyester-based fiber dyed materials which have excellent light fastness are obtained by using a specified three primary color blue dye mixture, yellow dye mixture and red dye mixture in accordance with the present invention. Furthermore, mixed fibers where the fiber thickness differs and mixed fibers comprising polyester-based fibers which can be dyed with cationic dyes and regular polyester-based fibers can be dyed the same color with excellent light fastness.

All the references described above are incorporated by reference in their entirety for all useful purposes.

We claim:

1. A dye composition which comprises a blue colored dye mixture which contains from 71 to 90 wt % of a blue pigment which is represented by structural formula (1)

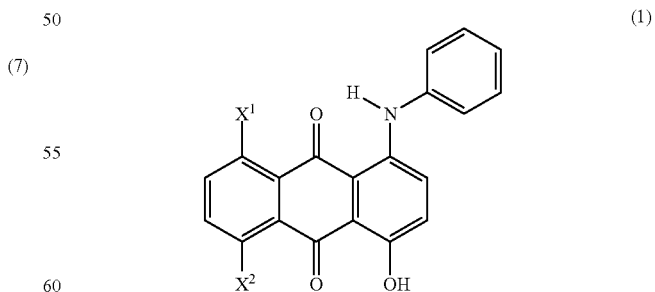

wherein one of $X^1$ and $X^2$ represents $NO_2$ and the other represents OH, and from 10 to 29 wt % of two different blue pigments which are different and are represented by structural formula (2)

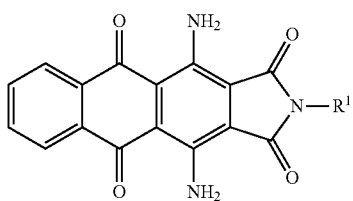

wherein R¹ represents —C$_3$H$_6$OCH$_3$, —C$_3$H$_6$OC$_2$H$_5$ or —C$_3$H$_6$OC$_2$H$_4$OCH$_3$.

2. The dye composition as claimed in claim 1, which comprises 72 to 85 wt % of a blue pigment which is represented by structural formula (1)

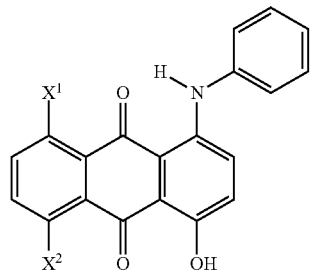

wherein one of X¹ and X² represents NO$_2$ and the other represents OH, from 5 to 15 wt % of a blue pigments which is represented by structural formula (2')

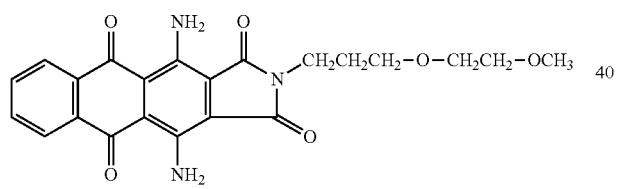

and from 5 to 15 wt % of a blue pigments which is represented by structural formula (2")

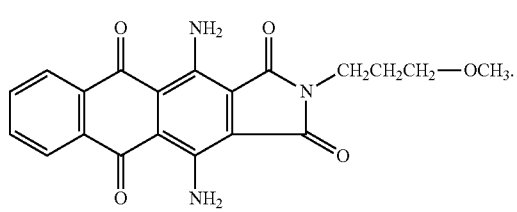

3. The dye composition as claimed in claim 2, which consists essentially of
   75 to 85 wt % of a blue pigment which is represented by structural formula (1),
   5 to 15 wt % of a blue pigments which is represented by structural formula (2') and
   5 to 15 wt % of a blue pigments which is represented by structural formula (2").

4. The dye composition as claimed in claim 2, which consists of
   75 to 85 wt % of a blue pigment which is represented by structural formula (1),
   5 to 15 wt % of a blue pigments which is represented by structural formula (2') and
   5 to 15 wt % of a blue pigments which is represented by structural formula (2").

5. The dye composition as claimed in claim 1, which does not have any pigment fraction represented by structural formula (3)

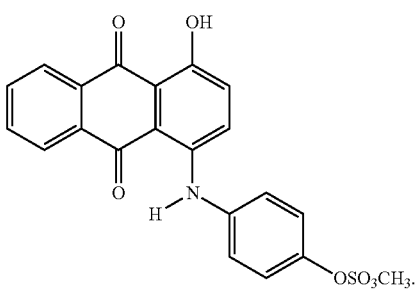

6. The dye composition as claimed in claim 2, which does not have any pigment fraction represented by structural formula (3)

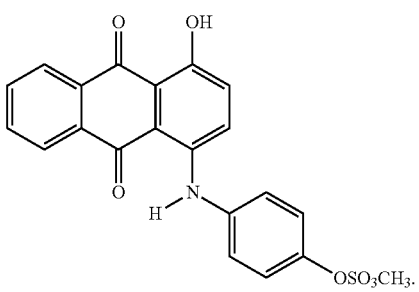

7. The dye composition as claimed in claim 3, which does not have any pigment fraction represented by structural formula (3)

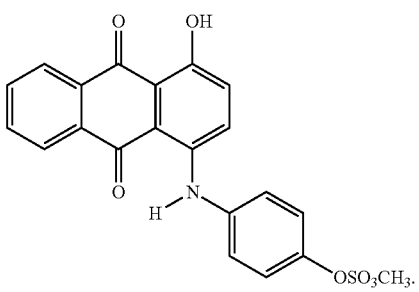

8. The dye composition as claimed in claim 4, which does not have any pigment fraction represented by structural formula (3)

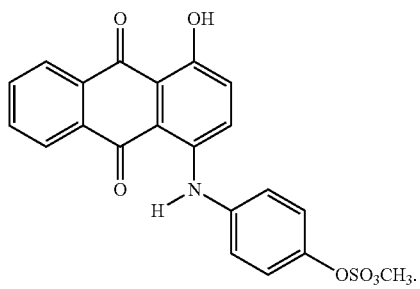

(3)

9. The dye composition as claimed in claim 1, which further comprises
at least one yellow dye,
at least one red dye or
a mixture of at least one yellow dye and at least one red dye
wherein
said yellow dye contains a yellow pigment represented by structural formula (5)

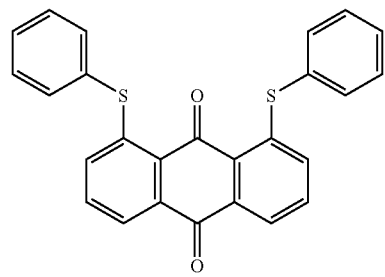 [SMILES: O=C1c2cccc(Sc3ccccc3)c2C(=O)c2c(Sc3ccccc3)cccc21]

a yellow pigment represented by structural formula (6)

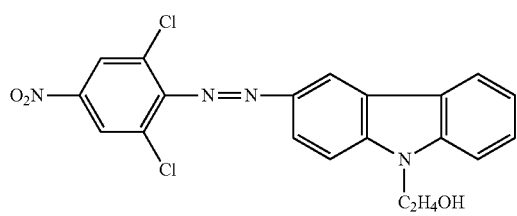

(6)

or a yellow pigment represented by structural formula (7)

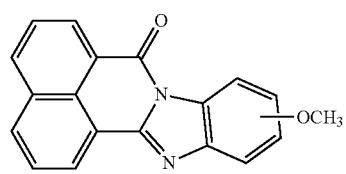

(7)

or a mixture of at least two of the a yellow pigments of the structure formulas (5), (6) or (7), and said red dye contains a red pigment represented by structural formula (8)

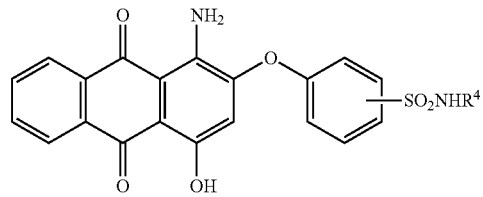

(8)

wherein $R^4$ represents a $C_1$ to $C_3$ alkoxy $C_1$ to $C_3$ alkyl group,
a red pigment represented by the structural formula (9)

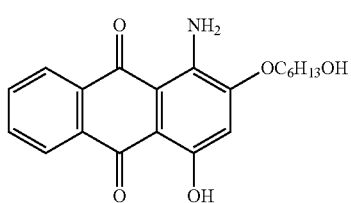

(9)

or a red pigment represented by structural formula (10)

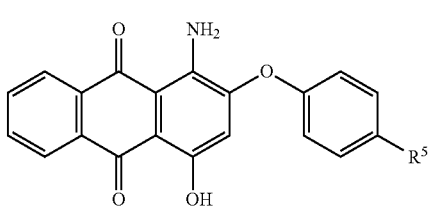

(10)

wherein $R^5$ represents a hydrogen atom, a chlorine atom or a bromine atom, or a compound of the formula (11)

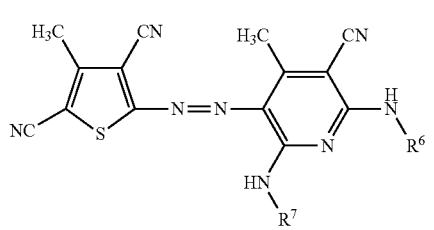

(11)

wherein one of $R^6$ and $R^7$ is a hydrogen atom and the other is hydroxyethoxyethyl, hydroxybutoxypropyl, acetoxyethoxyethyl or acetoxybutoxypropyl
or a mixture of at least two of the red pigment of the structure formulas (8), (9) or (10).

10. The dye composition as claimed in claim 9, wherein the composition requires a yellow dye of the structural formula (7).

11. A method of dyeing polyester-based fibers which comprises contacting the fibers with the composition as disclosed in claim 1.

12. A dyed polyester-based fiber material which has been dyed using a blue dye composition as disclosed in claim 1.

13. The method of dyeing polyester-based fibers according to claim 11 in which the polyester-based fibers are mixed fibers of different fineness.

14. The dyed polyester-based fiber material according to claim 12 in which the polyester-based fibers are mixed fibers of different fineness.

15. The method of dyeing polyester-based fibers according to claim 13 in which the polyester-based fibers are mixed fibers comprising polyester-based fibers which can be dyed with a cationic dye and regular polyester-based fibers.

16. The dyed polyester-based fiber material according to claim 14 in which the polyester-based fibers are mixed fibers comprising polyester-based fibers which can be dyed with a cationic dye and regular polyester-based fibers.

* * * * *